(12) United States Patent
Kunz et al.

(10) Patent No.: US 8,635,546 B2
(45) Date of Patent: Jan. 21, 2014

(54) ZERO FIXED PLACEMENT ADS

(75) Inventors: Michael C. Kunz, Seattle, WA (US); Ari D. Galen, Redmond, WA (US); Chad S. Estes, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/564,674

(22) Filed: Sep. 22, 2009

(65) Prior Publication Data

US 2011/0072374 A1    Mar. 24, 2011

(51) Int. Cl.
*G06F 3/048* (2013.01)
*G06Q 30/00* (2012.01)

(52) U.S. Cl.
USPC ........... 715/765; 715/764; 715/788; 705/14.4

(58) Field of Classification Search
USPC ........................... 715/764, 765, 788; 705/14.4
See application file for complete search history.

(56) References Cited

U.S. PATENT DOCUMENTS

| 6,990,498 | B2 | 1/2006 | Fenton et al. |
|---|---|---|---|
| 2002/0070978 | A1 | 6/2002 | Wishoff et al. |
| 2002/0120507 | A1 | 8/2002 | Chanos et al. |
| 2005/0096980 | A1 | 5/2005 | Koningstein |
| 2005/0256941 | A1 | 11/2005 | Armstrong et al. |
| 2006/0143568 | A1 | 6/2006 | Milener et al. |
| 2008/0091526 | A1* | 4/2008 | Shoemaker ............ 705/14 |
| 2009/0055254 | A1 | 2/2009 | Madhavan et al. |
| 2009/0106104 | A1* | 4/2009 | Upendran et al. ........... 705/14 |

OTHER PUBLICATIONS

"DoubleClick Rich Media: Formats: Expanding", retrieved at <<http://emea.doubleclick.com/uk/products/richmedia/expanding.aspx>>, Jul. 13, 2009, p. 1.
"Introducing Expandable Ads on AdSense Sites", retrieved at <<http://adsense.blogspot.com/2009/03/introducing-expandable-ads-on-adsense.html>>, Jul. 13, 2009, pp. 7.
"Flashtalking Expandable Video", retrieved at <<http://advertising.microsoft.com/uk/flashtalking-expandable-video>>, Jul. 13, 2009, pp. 2.

* cited by examiner

*Primary Examiner* — Ting Lee
(74) *Attorney, Agent, or Firm* — Wolfe-SBMC (57) ABSTRACT

Techniques for zero fixed placement (ZFP) ads are described. ZFP ads may be triggered independently of a fixed placement for the ad in a user interface. In an implementation, data describing a user interface includes a trigger associated with a ZFP ad. The ZFP ad may be configured to set various modifiable attributes of the user interface. Setting the modifiable attributes of the page enables a ZFP to modify both the appearance and layout of elements and modules included in the user interface. A client may load the data having the trigger and render the user interface without presenting the associated ZFP ad or including a placeholder for the ZFP ad. When the trigger is detected, the client executes the associated ZFP ad, modifies attributes of the user interface in accordance with the ZFP ad, and outputs the modified user interface to present the ZFP ad.

20 Claims, 5 Drawing Sheets

Fig. 5

# ZERO FIXED PLACEMENT ADS

BACKGROUND

The use of the Internet and World Wide Web (or simply the Web) is ever increasing. Web-enabled applications may make use of webpages and other user interfaces that are retrieved from servers and displayed on a user's computer to integrate web resources (e.g., content and services) within applications of the computer.

In some situations, a provider that makes web resources available to users generates revenue by reserving fixed placeholders for advertisements (ads) in the layout of user interfaces for the resources and selling the reserved space to companies or individuals. This allows an advertiser to display advertisements to users when they are displaying or interacting with various resources, such as when navigating to webpages using a browser. These advertisements, however, can result in awkward appearing webpages because the appearance of the advertisements may be inconsistent with the appearance of the remainder of the webpage. Further, reserving fixed placeholders for ads in a user interface limits flexibility and consumes space that might otherwise be used for additional content.

SUMMARY

Techniques for zero fixed placement (ZFP) ads are described. ZFP ads may be triggered independently of a fixed placement for the ad in a user interface. In an implementation, data describing a user interface includes a trigger associated with a ZFP ad. The ZFP ad may be configured to set various modifiable attributes of the user interface. Setting the modifiable attributes of the page enables a ZFP to modify both the appearance and layout of elements and modules included in the user interface. A client may load the data having the trigger and render the user interface without presenting the associated ZFP ad, or including a placeholder for the ZFP ad. When the trigger is detected, the client executes the associated ZFP ad, modifies attributes of the user interface in accordance with the ZFP ad, and outputs the modified user interface to present the ZFP ad.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques for placing ads in user interfaces associated with web resources involves using ad placeholders fixed within a layout for the user interface. Different ads may then be obtained from ad sources and presented using the placeholders. Since the placeholders are fixed, flexibility to customize the user interface is limited. Moreover, appearance of the user interface and the ads may not be coordinated, which can result in awkward differences in appearance.

Techniques for zero fixed placement (ZFP) ads are described. ZFP ads may be triggered independently of a fixed placement for the ad in a user interface. Moreover, ZFP ads may incorporate code that enables interactions with an ad interface of a client to create modifications of the user interface. The modifications may include altering the layout of elements and modules included in the user interface. Further, the modifications may enable a variety of customized functionality (e.g., interactive features) to be added to a user interface. Advertisers may make use of modifications that are available via the ad interface to coordinate their ads with a user interface in which the ads appear and produce rich ad presentations that include a variety of content types, styles, layouts, sizes, colors, interactive features, and so forth For instance, a webpage definition may be configured to include a script to define a trigger and associate an ad with the trigger. The trigger may be implemented as an invisible element or ad of the webpage. This may include a hidden ad that is embedded with the script associated with the webpage, a transparent ad such as a single pixel image, or an ad that matches the color of the background of the webpage. When the webpage is loaded by a browser, the trigger may be initiated to enable the associated ad. The ad may be configured to define various modifiable attributes to coordinate the look and feel between the webpage and the ad. When the browser detects occurrence of the trigger, the browser may cause execution of the ad to modify attributes of webpage. The browser may then output the modified webpage to present the ad.

In the discussion that follows, a section entitled "Example Environment" describes an example environment and devices, which may be employed to provide zero fixed placement (ZFP) ads in various embodiments. Following this, a section entitled "Example Procedures" describes example techniques related to zero fixed placements ads in accordance with one or more embodiments. After that, a section entitled "Zero Fixed Placement Implementation Examples" describes example implementation details of zero fixed placement ad techniques that may be employed in one or more embodiments. Last, a section entitled "Example Devices" is provided and describes example devices that can be used to implement one or more embodiments.

Example Environment

Figure 1:
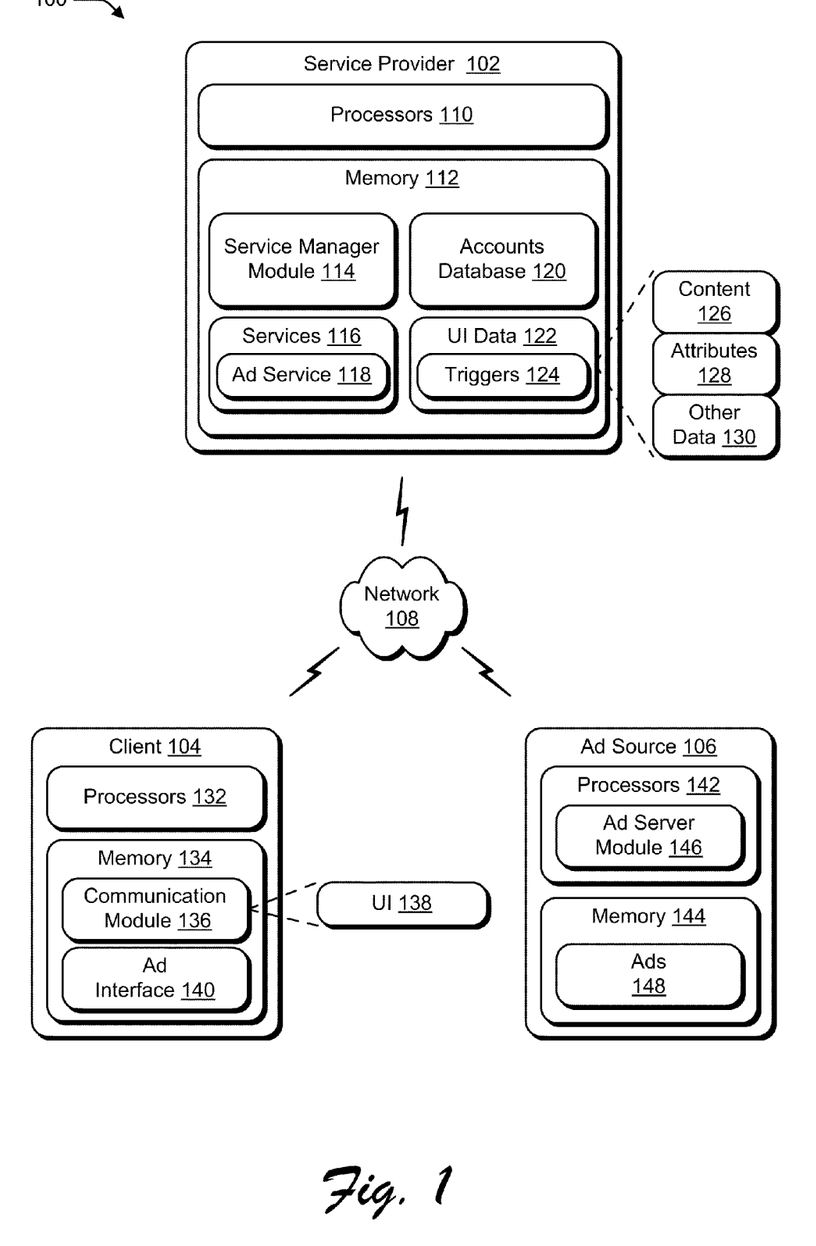
FIG. 1 is an illustration of an environment in an example implementation that is operable to provide zero fixed placement ads.

FIG. 1 is an illustration of an example environment 100 that is operable to provide zero placement fixed placement (ZFP) ads. The illustrated environment includes one or more service providers 102, one or more clients 104, and one or more ad sources 106 that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a service manager module 114 in the memory 112 that is executable via the one or more processors 110. Service manager module 114 represents functionality operable by service provider 102 to manage various services 116 that may be made available over the network 108. For example, various services 116 may be provided via web pages or other user interfaces that are communicated over the network for output by the one or more clients 104. Service manager module 114 may manage access to the services 116, performance of the services 116, configuration of user interfaces or data to provide the services 116, and so on.

Some examples of services 116 include, but are not limited to, a search service, an email service to send and receive email, an instant messaging service to provide instant messages between clients 104, and a social networking service to facilitate connections and interactions between groups of users who share common interests and activities. Services 116 are also illustrated as including an advertisement service 118. The advertisement service 118 may enable advertisers to place ads for presentation to clients 104 in conjunction with other services. This may include placement of ZFP ads in accordance with techniques described herein. Additional examples of services 116 include a shopping service, a weblog service, productivity service, authentication service, a news service, and an advertisement service to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token or use other suitable authentication techniques to enable access to corresponding services 116. Authentication of the client 104 to an account may provide access to a single corresponding service provider 102 and/or service 116. Additionally or alternatively, -a single authentication may correspond to many services 116, such that authentication to a single account provides access to many service providers 102 and/or to an entire suite of services 116.

The service manager module 114 may also manage an accounts database 120 that may be configured to store a variety of data related to user accounts with the one or more service providers 102. By way of example and not limitation, accounts database 120 may store account identifiers that may be used for authentication and access control (e.g., unique account IDs, usernames, passwords, and so on) and profile data that may correspond to personal data and pages accessible through various services 116. A variety of other data is also contemplated, including service authorizations, user preferences, program files such as documents and spreadsheets maintained online, and other data typically associated with user accounts.

The service provider 102 is also depicted as storing user interface (UI) data 122 in memory 112 that relates to user interfaces configured to enable various interactions with the services 116. User interface data 122 is representative of various code that may define webpages and/or other user interfaces for applications of the clients 104. User interface data 122 may include but is not limited to HTML, XML, JavaScript, Cascading Style Sheets (CSS), and other code and/or mark-up languages typically used to define user interfaces or portions thereof.

Rather than defining fixed placements for ads, user interface data 122 may make use of triggers 124 for the ads. The triggers 124 may be associated in various ways with ads from the ad source 106 (or other suitable sources) that are to be presented when the trigger occurs. The triggers 124 are independent of a reserved or fixed location for corresponding ads in the layout of a user interface. Thus, instead of selling fixed space to advertisers, service provider 102 through advertising service 118 may enable advertisers to associate ads with various triggers 124 embedded in or otherwise defined by a user interface. Ads that make use of the triggers 124 are referred to herein as zero fixed placement (ZFP) ads. In general, triggers 124 may be configured to cause execution of associated ZFP ads upon the occurrence of different events. The triggers 124 may be configured in various ways, further discussion of which may be found in relation to the following figures.

The user interface data 122 may also define content 126 and attributes 128 associated with a corresponding user interface (UI). Content 126 may be included in and/or referenced by the user interface data 122. A variety of attributes 128 may be set to control an appearance of a corresponding user interface. By way of example and not limitation, attributes may be employed to select different content modules, set a layout for the UI and content modules, select colors, set a background image, add sounds and/or video, designate a theme for the UI, present animations and other special effects, and so forth. At least some of the attributes 128 may be modifiable via ads to enable the advertiser to have selective control over the appearance of a user interface in which their ads are placed. User interface data 122 may also include various other data 130, such as templates, theme definitions or identifiers, authentication information, ad source identifiers, content URLs, and so forth. Further discussion of various attributes and themes that may be modified using ZFP ads may be found in relation to the following figures.

The one or more clients 104 are depicted as having one or more processors 132 and memory 134. To enable various communications over the network 108, the one or more clients 104 may also include a communication module 136. Communication module 136 may be configured to process user interface data 122 from the service provider 102 to output a corresponding user interface 138.

The communication module 136 is depicted as being stored in memory 134 and is also executable via the processor 132 to provide various interactions with service providers 102 and/or services 116. Examples of such interaction include, but are not limited to, communicating one to another, navigating content, searching web pages, accessing services 116, interacting with ad sources 106, accessing web pages and other resources, instant messaging, e-mail, and so forth. The communication module 136 may be implemented as a browser or other suitable application to obtain and output webpages from the service provider 102 over the network 108. The communication module 136 may also represent a component of another application used to obtain one or more services 116 from the service providers 102. For example, a communication module 136 may be configured as a component of an email application, an instant messaging application, or other Web-enabled application of a client 104.

Communication module 136 may include or otherwise make use of an ad interface 140 to enable presentation of one or more ZFP ads, as well as other ads, in user interfaces 138 output via the communication module 136. In particular, ad interface 140 represents functionality operable to detect triggers 124 for ads and, in response, output a modified user interface that presents an associated ad. Again, this may occur independently of reserving space in the user interface 138 for an ad. As discussed in greater detail below, this may involve obtaining an ad associated with a trigger 124 from an ad source 106, setting attributes 128 of a user interface 138 in accordance with the ad, and outputting a modification of the user interface 138 that includes a presentation of the ad. In an embodiment, functionality represented by the ad interface 140 may be implemented as an application programming interface (API) that exposes methods to set attributes 128 of a user interface 138 that are modifiable. In this example, ads may be configured to cause calls to the API to set the attributes 128, and accordingly create the modification of the user interface 138.

The one or more ad sources 106 are depicted as having one or more processors 142 and memory 144. Processor 142 is depicted as executing an ad server module 146 that is also storable in memory 144. Ad server module 146 represents functionality operable to serve ads in response to ad requests from clients 104. Such requests may be made by a client 104 in response to occurrence of triggers 124. Memory 144 is depicted as storing ads 148 that may be provided over the network 108 to the clients 104. The ads 148 stored by ad sources 106 may include ZFP ads, as well as traditional ads. Ads 148 may be configured to include various combinations of text, video, audio, animations, images, and so forth.

The ZFP techniques also enable ads that are ZFP capable to define and set attributes 128 of a UI 138. In this manner, ZFP ads may create a flexible and rich presentation that includes a variety of content types, styles, layouts, sizes, colors, and so forth. ZFP ads are not limited to, or driven by, fixed characteristics (e.g., size, location, shape, and timing) of traditional placeholders. Moreover, the appearance and/or layout of the UI for an ad may be modified to coordinate the UI with the ad. By doing so, advertisers may achieve an integrated look and feel that enhances their ads and avoids discontinuities between ads and UI's (e.g., differing styles, fonts, themes, color schemes, and so forth) that may occur with traditional techniques.

Having considered devices and components of an example environment, consider now example zero fixed placement ad procedures that may be implemented in the environment using the example components, as well as in other environments.

Example Procedures

The following discussion describes techniques for zero fixed placement ads that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
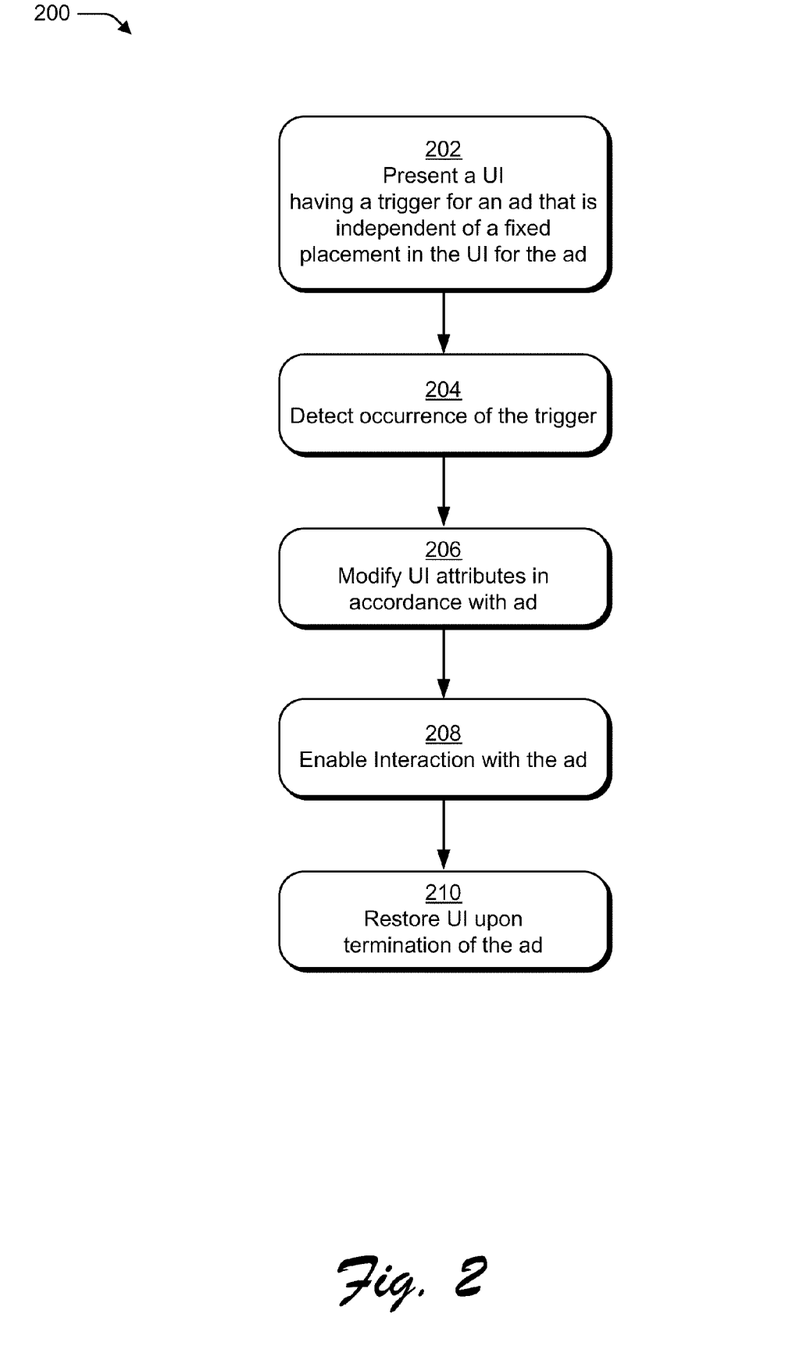
FIG. 2 is a flow diagram depicting an example procedure in which a client presents zero fixed placement ads.

FIG. 2 depicts a procedure 200 in an example implementation in which a client presents zero fixed placement ads. In at least some embodiments, procedure 200 may be performed by a suitably configured client, such as by a client 104 of FIG. 1 having a communication module 136 that makes use of an ad interface 140. The ad interface 140 may be implemented as a component of the communication module 136, or as a standalone component. Further, the ad interface 140 may be provided by way of script that is downloaded along with UI data 122 obtained from a service provider 102. Ad interface 140 may also be implemented as a network-based application that the client 104 accesses from a server and utilizes over the network 108.

A UI is presented having a trigger for an ad that is independent of a fixed placement in the UI for the ad (block 202). One way this may occur is by way of a communication module 136 executed by the client 104 of FIG. 1. The communication module 136 may represent various client applications (or a component of the applications) that makes use of network-based resources, including but not limited to a browser, an email client, a productivity suit, a messaging application, and so on. For example, communication module 136 may be configured as an email application that enables electronic communications. A user interface 138 for the email application may be output to present an inbox associated with a user account/identity and to enable email functionality such as viewing, preparing, sending, and receiving email. The user in this example may have an account that is accessible to make use of various resources (e.g., services 116 and content 126) from the service provider 102, including email service. The user interface 138 may also be configured to present various ads the user. At least some of these ads may be configured as ZFP ads as described herein. By way of the email application, client 104 may obtain UI data 122 that includes one or more triggers 124 for ZFP ads that may appear in the user interface 138.

Occurrence of the trigger is detected (block 204). In the above example, ad interface 140 may be configured to detect occurrence of a trigger 124 that is associated with a ZFP ad for the email client. Triggers 124 may be configured in various ways to cause execution of ads responsive to different events. For example, triggers 124 may occur according to timers, a user selection, interaction with particular elements of a UI, and so forth. Triggers 124 may also be implemented to occur on the server side in response to client requests. For instance, ad service 118 can be configured to include ZFP ads in pages that are served based upon a number of times a page is accessed (e.g., every $5^{th}$ time), based on context information in the request (e.g., user contacts, browsing history, and profile data), and so forth. Various example triggers 124 for the email application may be configured to occur when an inbox folder is opened, upon selection of an email, and/or when a cursor is "hovered" over different portions of the UI or a particular email.

The UI is modified in accordance with the ad (block 206). In at least some embodiments, modification of a UI occurs by setting attributes 128 for the UI as defined by the ad. In another example, an ad may describe or select a theme (e.g., a collection of attributes, properties, and behaviors) for a UI that is applied upon occurrence of the trigger.

In the preceding example, ad interface 140 may be invoked by the email application to cause modifications of various attributes of a UI, or application of a theme for the email application. This may include changing an appearance and/or a layout of the UI. Typically, the ad is presented within the UI. In other words, the UI, ad, and modifications may be presented within a single application window. The UI in this case is modified according to attributes designated by the ad. Thereafter, the modified UI having the ad may be output via the email application. Other applications may be configured in a similar manner to create UI modifications in accordance with a ZFP ad that is configured to control various attributes 128. Additional details regarding various triggers, modifiable attributes, and themes that may be employed with one or more embodiments of ZFP ads are described in relation to FIG. 4 below.

Interaction is enabled with the ad (block 208). In general, various interactions may be enabled for ZFP ads presented in a user interface. For instance, ZFP ads may include controls selectable to enable resizing and repositioning of the ad within a user interface. For animated or other audio/visual ads, the ads may include controls operable to pause, stop, or replay the ad, and so forth. Interaction may also include functionality selectable to close out a presentation of an ad. Still further, ads may incorporate mini-games, slideshows, videos, and other functionality and interactive features that provide at least some interactive control to a user. Controls and corresponding interaction may be defined, enabled, and/or or disabled at least in part by selectively setting attributes 128 by a particular ad.

Upon termination of the ad, the UI is restored (block 210). In the continuing example, an ad presented via the email application may be terminated after a certain amount of time, when a user closes the ad, upon navigation to another email or folder, and so forth. When termination of the ad occurs, the UI is restored. In other words, the modifications caused by the ad may be reversed and the presentation of the ad may be concluded.

In at least some embodiments, some of the modifications to a particular UI caused by an ad may be preserved. For instance, interactive features of the ad may enable a user selection to maintain modifications made by the ad. In one example, an option may be provided to the user to enable the user to save modifications made by an ad as a theme. The theme may then be applied to the particular UI and/or may be available for use with other UI's associated with the user and/or a client 104.

Optionally, a fixed ad may be introduced following execution of the ZFP ad. The fixed ad may be operable (e.g., selectable) to "replay" the ad presentation. Note that traditional fixed ads may also be employed in a UI in conjunction with the ZFP ads described herein. However, unlike traditional techniques the flexible and rich presentations enabled via ZFP techniques do not rely upon a connection to fixed placeholders in a user interface. Thus, fixed ads may be employed in conjunction with ZFP techniques in a manner that does not interfere with the independence of ZFP ads to fixed placeholders. For instance, a fixed ad and a ZFP ad for the same product may appear in a user interface, however, there may be no functional connection between the fixed ad and the ZFP ad.

Figure 3:
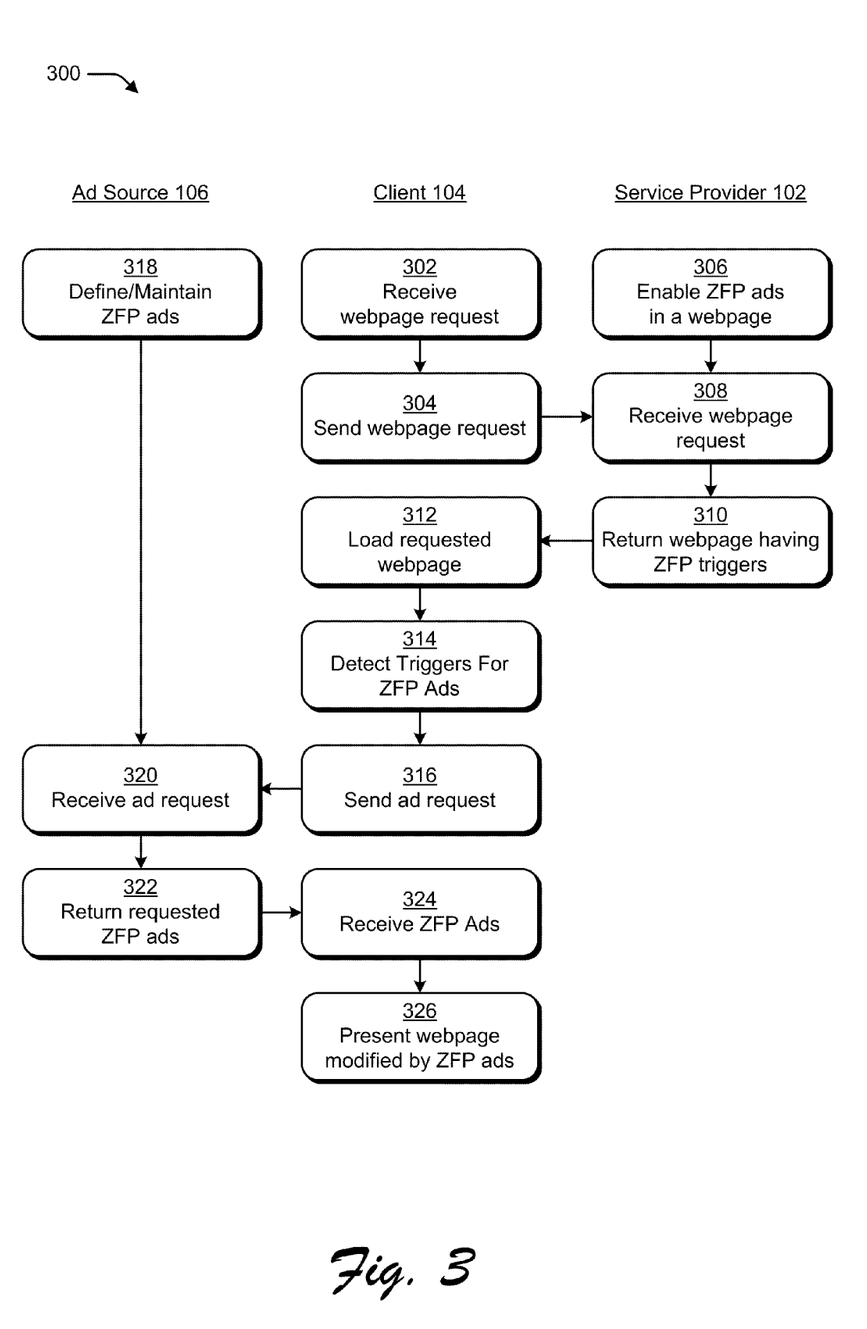
FIG. 3 is a flow diagram illustrating an example procedure for a system operable to implement zero fixed placement ads.

FIG. 3 is a flowchart illustrating an example procedure 300 for implementing zero fixed placement ads. Acts of procedure 300 illustrated on the left-hand side of FIG. 3 may be carried out by an ad source, such as ad source 106 of FIG. 1. Acts of procedure 300 illustrated in the middle of FIG. 3 may be carried out by a client 104. For example, the acts may be performed by a browser, or other suitably configured communication module 136 of a client 104, that enables interaction with various webpages, or other UI's, that are provided at least in part over the network 108. To do so, the browser may include or otherwise make use of an annotation interface 140. Acts of procedure 300 illustrated on the right-hand side of FIG. 3 may be carried out by a service provider, such as service provider 102 of FIG. 1.

At the browser, a webpage request is received (block 302). This request may be received from a user, may be a default request of the browser, may be received from another application, and so forth. The browser sends a request to the service provider for the requested webpage (block 304). The service provider maintains or hosts one or more pages that enable zero fixed placement ads (block 306), making these pages available to requesters. To enable ZFP ads in webpages, the pages may be configured to include triggers 124 instead of including fixed placeholders, positions, or space in the layout defined for the pages. The service provider receives the page request (block 308) and returns the requested page having the triggers for ZFP ads to the requester (block 310).

The browser receives the requested webpage from the service provider and loads the webpage (block 312). In the course of loading the webpage, the browser may identify triggers 124 for ZFP ads and determine whether the triggers 124 are enabled. Also during loading, the browser may obtain ads associated with an identified trigger 124. In other words, the ads may be pre-loaded when the webpage itself is loaded. In at least some embodiments, the ads (e.g., actual ad definition and/or content) may be received along with the webpage. In this case, service provider 102 may operate to configure the webpages with the ads prior to sending the webpages to the client 104. Alternatively, the browser may obtain ads through interaction with one or more ad sources 106. Additionally, the ads may be obtained apart from loading the webpage, such as when an associated trigger 124 occurs.

The browser may render the requested webpage for presentation to a user of the client 104. The browser also detects occurrence of triggers associated with ZFP ads for the webpage (block 314). The triggers 124 may be configured as script in the webpage that initiates ZFP ads upon the happening of different events. Triggers 124 may be tied to a single hidden pixel or other invisible element of the webpage, such as an element or ad configured to match the background color. These triggers are independent of a fixed ad placeholder in the webpage. As such, underlying fixed ads (e.g., banner ads, pre-placed ads, and so forth) corresponding to the triggers 124 may not appear when the browser renders the webpage. Rather, the ZFP ads are executed upon occurrence of an associated trigger 124.

In instances in which ads are not pre-loaded, the browser may send an ad request to the ad source to obtain ads associated with a trigger (block 316). In any of the ad loading scenarios described above, a context associated with the browser may be employed to select ads related to the context. For example, a browsing history, user profile, website context, and/or user interaction may be employed to select ads targeted to the user. In this example, a particular trigger 124 may selectively cause different ads to be presented to different users in accordance with the context. Context information to enable selective presentation of ads may be communicated to the service provider 102 when a webpage is initially requested. Additionally or alternatively, the context information may be included with an ad request made to the ad source 106.

The ad source defines and/or maintains one or more ads (block 318), making these ads available to requesters. The ads may include ZFP ads, as well as traditional ads. The ad source receives the ad request (block 320) and returns one or more ZFP ads to the requester (block 322). For example, ad server module 146 may process ad requests and return corresponding ads. To do so, ad server module 146 may make use of context information that is provided with a request to serve targeted ads. In this manner, different users accessing the same webpage may be served different ads.

Web browser receives the ad(s) from the ad source (block 324), and the browser presents the webpage as modified by the ZFP ads (block 326). For example, ad interface 140 may communicate over the network 108 with the ad server module 146 to obtain ZFP ads in response to ad requests. In instances in which ads are pre-loaded, the requesting and receiving just described may occur when the webpage is loaded in block 312. The pre-loading may be employed to reduce latency in presentation of ads when an associated trigger occurs.

Regardless of how and when the ZFP ads are loaded, ZFP ads may be configured to define attributes 128 of the webpage to achieve a rich ad presentation as discussed above. The browser is configured to modify the webpage in accordance with the ZFP ads. For example, the browser may make calls defined by the ZFP ads to the ad interface 140 to modify various attributes 128 of the webpage. The ad interface 140 may be configured as an add-in or other integrated component of the browser. The ad interface 140 may also be configured as a separate component, such as an API that is callable via the browser, as well as by other applications, to enable ZFP ads for corresponding user interfaces. The browser may render a modified UI that includes the modifications caused by the ZFP ads. A presentation of the ZFP ads may occur within the modified UI.

The webpage content and the ad presentation may appear within a single window of the browser. In other words, ZFP ads may be implemented without employing pop-up windows to present the ZFP ads. The ad presentation in the modified UI may include various interactive aspects operable by a user as noted above. Upon completion or termination of the ad presentation, the browser may undo the modifications to the UI to restore the UI to its pre-ad appearance. An illustrative example of a modification of UI that makes use of ZFP ads is described below in relation to FIG. 4.

Having considered example procedures related to zero fixed placement ads, consider now a discussion of example implementations of zero fixed placement ads that may be employed in one or more embodiments.

Zero Fixed Placement Implementation Examples

Figure 4:
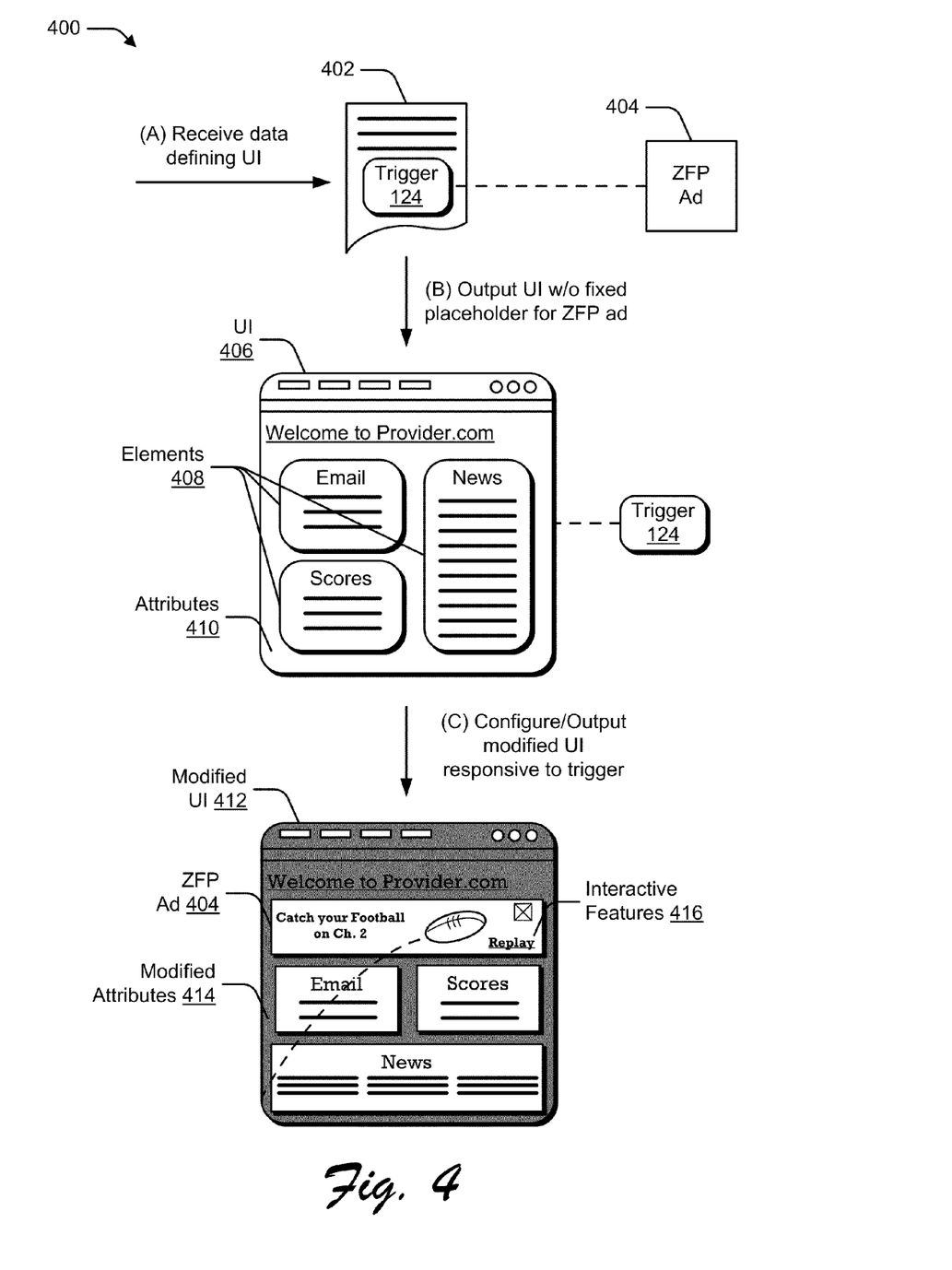
FIG. 4 is a diagram depicting an example implementation of zero fixed placement ads in a user interface that may be presented via a client.

The following discussion describes example implementation details of zero fixed placement ad techniques that may be employed in one or more embodiments. These implementation details are described in relation to an example modification of a UI as illustrated in FIG. 4. Just below, a description of the example depicted in FIG. 4 appears and thereafter various implementation details are described with reference to the depicted example.

In particular, FIG. 4 illustrates an example implementation 400 showing example acts that may occur in the course of employing ad triggers to execute a ZFP ad. Data describing at least some portions of a user interface may be received by a client (Act A). For instance, a document 402 is depicted in FIG. 4 that represents data received by a client 104 that defines a user interface. In at least some embodiments, the client 104 may communicate with a service provider 102 to obtain data for a UI configured to enable interaction with services 116 available from the service provider 102. The client 104 may obtain data that defines a complete UI, defines at least some portions and/or elements of the UI, includes instructions to cause a UI to be rendered, or otherwise provides data sufficient to enable the client to form the user interface. In at least some embodiments the document 402 is configured as a mark-up language document (e.g., HTML, XML, and/or other suitable code) that describes one or more pages to be rendered by applications of a client, including but not limited to webpages for a client browser. The document 402 further includes a trigger 124 that is associated with a ZFP ad 404. The ZFP ad 404 may be available from an ad source 106, a service provider 102, or another suitable location configured to serve ads.

An application of the client may make use of the data to output a UI defined by the data that does not include a fixed placeholder for the ZFP ad (Act B). For instance, the document 402 may enable a client 104 to render a UI 406 configured for interaction with one or more services 116. In the depicted example, the document 406 represents a webpage that may be obtained over the network from a service provider 102 and output via a browser. In particular, the webpage is depicted as a home page for "Provider.com" that may be output within a document display portion of a UI for the browser. The document 402 may describe various elements 408 that appear in the UI. Example elements 408 of the "Provider.com" home page include a "News" portion to present news stories, an "Email" portion to enable user interaction with an Email account, and a "Scores" portion that may include sports stories and scores. The document 402 may also describe various attributes 410 for the UI that may be configured to control the appearance, style, and layout of the UI 406 and/or the elements 408. The UI 406 is illustrated being associated with the trigger 124 defined by the document 402. The trigger is illustrated to the side of UI 406 to represent that the trigger does not appear in UI. In other words the trigger 124 may be configured as an invisible or hidden element defined by the document 402.

Responsive to occurrence of the trigger, the client application may configure and output a modified UI (Act C). In particular, a modification of the UI 406 may occur when the trigger 124 corresponding to the UI 406 is detected. The modification may be defined by and/or caused by the ZFP ad 404 that is associated with the trigger 124. FIG. 4 depicts an example modified UI 412 that may be output in response to the trigger 124 and includes the ZFP ad 404. The modified UI 412 is configured to display a presentation of the ZFP ad 404. For instance, the example of FIG. 4 depicts an ad for football on "Channel 2". When presented, the example ad may show a football that appears to be thrown across the modified UI 412.

The modified UI 412 also includes modified attributes 414 that are modified in accordance with the ZFP ad 404. For instance, in the example "Provider.com" home page, the browser may configure attributes as defined by the ZFP. The modified UI 412 may further include interactive features 416, such as a button to close the ad, an option to replay the ad, a feature enabling a user to select and "throw" the football around the UI, and so on. Consider now example implementation details regarding triggers, attributes, and themes that are discussed with reference to the example modification depicted in FIG. 4.

Triggers for ZFP Ads

As noted previously, triggers 124 that are employed to implement ZFP ads may be configured in a variety of ways. In general, the triggers 124 are configured to cause execution of ZFP ads upon occurrence of various events. By way of example and not limitation, triggers 124 may be configured as script embedded within UI data 122 describing a page. The script may be configured to execute upon processing of a particular pixel of the UI. More particularly, the script to implement a trigger 124 may be tied to an invisible pixel or element of the UI. In other words, a rich ad presentation may be driven by a trigger 124 that is invisible to user (e.g., does not appear in the UI). When a UI is loaded, the script is processed and the corresponding trigger 124 may be initiated. The trigger 124 may then be set to occur to cause presentation of an ad in response to various events. Initiating a trigger 124 may include pre-loading of an ad related to the trigger 124 when a page is loaded. Alternatively, the script may be configured to cause an ad to be obtained apart from loading, e.g., when the corresponding trigger occurs.

In an embodiment, the triggers 124 may be implemented via calls to an interface configured to facilitate ZFP ads. For instance, an ad interface 140 may expose various functionality that is callable by a UI to associate triggers 124 with various events. In this example, UI data 122 may define functions calls to the ad interface 140 to select various events, associate triggers 124 for ads with the events, and initiate the triggers 124. Thus, instead of explicitly including the script to implement the triggers 124 with the UI data 122, the UI data 122 may specify variables for a trigger function that implements a trigger 124 for a ZFP ad. By way of example, a trigger function may be configured to accept as input an event name, an ad identifier, and an ad source identifier and to create a trigger 124 based on the input.

Triggers 124 may be associated with a variety of different events. This may include associations with timers, user input or selections, elements 408 of a UI, particular content or content modules, and so forth. For instance, the football ad of FIG. 4 may be triggered according to a timer that begins when the page is loaded. A timer may be set for various times, such as 5 seconds, 10 seconds, or 30 seconds after loading. In another example, the football ad may be triggered responsive to user input, such as when movement of a cursor or input of text is detected. In yet another example, a trigger may be set to occur and trigger the an ad when a user interacts in some manner (e.g., selects, hovers a cursor near or within, zooms in on, and so forth) with a particular portion of the of the user interface 402. For instance, the football ad of FIG. 4 may be triggered responsive to interaction with the "Scores" portion.

Note that the football ad presented in the example of FIG. 4 is a sports related ad that may be selected to correspond to the "Scores" portion. This illustrates one example of using context to select a particular ad. This selection may occur by including context information with ad requests made to an ad source. For instance, responsive to the user interaction with the "Scores" portion, a trigger associated with the "Scores" portion may cause data describing a sports context to be included with an ad request sent to an ad source 106. The ad source 106 that receives the request may make use of the context to select and return a sports related ad, such as the example football ad depicted.

If a user subsequently interacts with a different portion, the football ad may disappear and a trigger 124 associated with the different portion may cause presentation of a different corresponding ad. For example, a news ad may be selected responsive to interaction with the "News" portion.

Thus, triggers 124 may be configured in various ways to cause execution of ZFP ads that modifies attributes of a user interface responsive to various events.

Modifiable Attributes

ZFP ads described herein may create customizations for a user interface by setting a variety of modifiable attributes of the user interface. In general, attributes 128 associated with a user interface may be set to modify the look and feel of the user interface. This may include changing the appearance and layout of elements in the user interface. The modification may encompass formatting, service additions, themes, color schemes, animations, and so forth. This may also include adding or removing elements of the user interface. The ad may then be presented in conjunction with the modifications made to the user interface.

Attributes 128 may be set in a variety of ways. In one example, attributes 128 may be set by way of markup language tags configured to define a group of attributes that may be modified. For example, markup language tags may be employed to enable modifications of attributes 128 including but not limited to user interface controls, coloration, images, animations, page structure/layout, element shape, element size, styles, sounds, background, fonts, positions, and other modifiable attributes of the user interface. In an embodiment, a ZFP ad may be configured to designate values for the various attributes 128 using the tags coded within UI data 122. An ad interface 140 of a client 104 may be configured to process the tags to implement modifications designated by a particular ad when the ad is executed.

Other suitable techniques to implement attribute modifications are also contemplated. For instance a ZFP ad may be configured to make functions calls to the ad interface 140 to set attributes 128 using functions integrated with the ad interface 140 or with another application configured to make use of the ad interface 140. Another technique is to use script within a ZFP ad that is configured to define and cause modification through functionality integrated with a client operating system, such as by invoking a graphics management subsystem of the operating system.

Referring again to the example modified UI 412 of FIG. 4, a number of examples of modified attributes 414 are represented. Comparing the UI 406 to the modified UI 412 illustrates that background has been changed. For instance, the ZFP ad 404 may be configured to cause the background for the football ad to appear as an image of a football field. Modified attributes 414 also have been employed to rearrange the layout of the elements 408. Additionally, corners of the elements 408 now appear as squared off rather than rounded, and a different font has been selected for the modified UI 412 using modified attributes 414. Of course, FIG. 4 depicts just a few examples of the wide variety of modifications that may be made using ZFP ad techniques described herein. Accordingly, ZFP ads may be configured to set attributes 128 in various ways to define modified attributes and create customized ad presentations.

Themes

In at least some embodiments, a trigger 124 may cause a corresponding theme to be applied. A theme represents a collection of attributes, properties, and characteristics that may be applied to a user interface to control the look and feel of the user interface. Using themes may enable an ad (or other content item) to conveniently reference or otherwise make use of a designated theme rather than having to set different attributes 128 individually. Themes may be pre-defined and re-used by different ads. A theme name or other suitable identifier may be referenced by a ZFP ad to make use of a corresponding theme. A theme name or other identifier may be employed to implement a corresponding theme when initiated by a trigger 124 and/or ad. This enables a theme definition to be maintained apart from the ad that makes use of the theme. For instance, theme definitions may be available from a service provider 102, an ad source 106, locally at a client 104, or from another suitable storage location accessible to a client 104.

Additionally or alternatively, a ZFP ad may explicitly describe a collection of settings to define a custom theme. In this case, an option for a user to save, install, and/or make use of the theme may be exposed in conjunction with presentation of the ZFP ad via an application of a client 104.

A client 104 may selectively install various themes to enable selection of the themes by ZFP ads. The installed themes may then be available for use with a variety of different applications and user interfaces of the client 104. A theme initiated via ZFP techniques herein may even be applied as a desktop theme for the client 104. Service provider 102 may provide a theme service to enable creation, selection, sharing, downloading, and installation of various themes. Advertisers and users may create themes and publish the themes via the theme service to make the themes available for use by others. Thus, once a custom set of modifications is defined, the set of modifications may be saved as theme, shared among users, deployed to clients, and used in conjunction with ZFP ads, as well as being employed with various applications and user interfaces of a client 104.

Having considered example implementation details related to zero fixed placement ads, consider now a discussion of an example device that may be configured to implement aspects of zero fixed placement ad techniques in one or more embodiments.

Example Device

Figure 5:
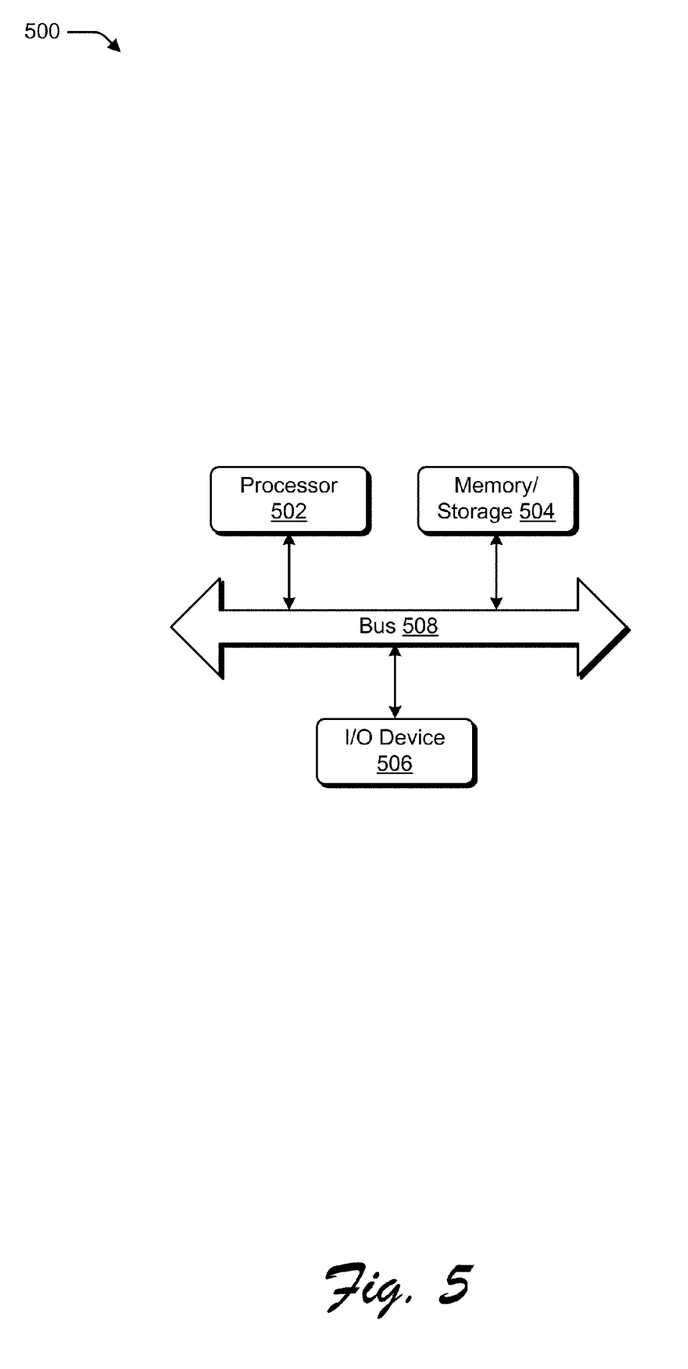
FIG. 5 is an illustration of an example device in accordance with one or more embodiments.

FIG. 5 illustrates an example computing device 500 that may implement the various embodiments described above. The computing device 500 may be, for example, a client 104 of FIG. 1, a server of a service provider 102, a server of an ad source 106, or any other suitable computing device.

The computing device 500 includes one or more processors or processing units 502, one or more memory and/or storage components 504, one or more input/output (I/O) devices 506, and a bus 508 that allows the various components and devices to communicate one to another. The bus 508 represents one or more of several types of bus structures, including a memory bus or memory controller, a peripheral bus, an accelerated graphics port, and a processor or local bus using any of a variety of bus architectures. The bus 508 can include wired and/or wireless buses.

The memory/storage component 504 represents one or more computer storage media. The memory/storage component 504 may include volatile media (such as random access memory (RAM)) and/or nonvolatile media (such as read only memory (ROM), Flash memory, optical disks, magnetic disks, and so forth). The memory/storage component 504 may include fixed media (e.g., RAM, ROM, a fixed hard drive, etc.) as well as removable media (e.g., a Flash memory drive, a removable hard drive, an optical disk, and so forth).

The one or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the ad interface 140, communication module 136, service manager module 114, ad server module 146, and other program modules, may be embodied as one or more instructions stored on computer-readable storage media. The computing device 500 may be configured to implement particular functions corresponding to the software or program modules stored on computer-readable storage media. Such instructions may be executable by one or more articles of manufacture (for example, one or more computing device 500, and/or processors 502) to implement techniques for zero fixed placement ads, as well as other techniques. Such techniques include, but are not limited to, the example procedures described herein. Thus, computer-readable storage media may be configured to store instructions that, when executed by one or more devices described herein, cause various techniques for zero fixed placement ads.

The computer-readable storage media includes volatile and non-volatile, removable and non-removable media implemented in a method or technology suitable for storage of information such as computer readable instructions, data structures, program modules, or other data. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although the zero fixed placement ad techniques have been described in language specific to structural features and/or methodological acts, it is to be understood that the appended claims are not necessarily limited to the specific features or acts described. Rather, the specific features and acts are disclosed as example forms of implementing the zero fixed placement ad techniques.

What is claimed is:

1. A method comprising:
supplying to an ad source context information associated with a browser provided by a client device to select an advertisement related to the context information for presentation via the browser;
presenting, by the client device via the browser, a user interface having a trigger associated with the selected advertisement, the trigger being configured to cause execution of the selected advertisement independently of a placeholder for the selected advertisement in a layout of the user interface;
causing execution, by the client device, of the selected advertisement via the user interface responsive to detecting occurrence of the trigger, the selected advertisement being configured to, when executed, modify the layout of the user interface by at least repositioning one or more elements of the user interface that are not associated with the selected advertisement; and
providing, by the client device, an option that is selectable to maintain, after termination of the selected advertisement, modifications made by the selected advertisement to the layout of the user interface.

2. A method as described in claim 1, wherein the user interface is configured to enable interaction via the client device with one or more services available over a network from a service provider.

3. A method as described in claim 1, wherein the selected advertisement, when executed, is configured to apply a theme to change the look and feel of the user interface.

4. A method as described in claim 1, wherein the trigger is configured as script incorporated with markup language code that describes the user interface.

5. A method as described in claim 1, wherein the trigger is configured as an invisible element of the user interface.

6. A method as described in claim 1, wherein the trigger is associated with a single pixel and is initiated by processing of the single pixel when the user interface is loaded by the client device.

7. A method as described in claim 1, further comprising:
requesting, by the client device, the user interface over a network from a service provider;
obtaining, by the client device, code from the service provider describing the user interface and the trigger in response to the requesting; and
processing, by the client device, the code to initiate the trigger.

8. A method as described in claim 1, further comprising sending an ad request to an ad source to obtain and pre-load the selected advertisement before occurrence of the trigger.

9. A method as described in claim 1, wherein causing execution comprises:
sending an ad request to an ad source responsive to occurrence of the trigger;
receiving the selected advertisement from the ad source in response to the request, the selected advertisement describing modifications to one or more attributes of the user interface;
rendering the user interface to include the modifications and present the selected advertisement.

10. A method as described in claim 9, further comprising including context information corresponding to the client device with the ad request to enable a selection by the ad source of the selected advertisement from among a plurality of advertisements, the selection based at least in part upon the context information corresponding to the client device.

11. A system as described in claim 1, wherein the context information includes one or more of a browsing history, user contacts, or profile data.

12. One or more computer-readable storage media comprising instructions that, when executed by a client device, cause the client device to:
request a user interface for an application of the client device from a service provider over a network, the request including context information associated with a user of the client device;
receive code from the service provider that describes the requested user interface and defines a trigger associated with a zero fixed placement (ZFP) advertisement, the ZFP advertisement being available over a network from an ad source, selected by the ad source based on the context information associated with the user, and configured to execute responsive to the trigger and describe one or more modifications for attributes of the user interface;
load the code to initiate the trigger;
detect when the trigger occurs;
modify the attributes of the user interface in accordance with the ZFP advertisement to produce a modified user interface, the attributes of the user interface being modified by at least rearranging a layout of elements of the user interface, the rearranging of the layout of elements including rearranging one or more elements that do not correspond to the ZFP advertisement;
present the ZFP advertisement as part of the modified user interface; and
provide a user-selectable option to enable the modified user interface to be maintained subsequent to termination of a presentation of the ZFP advertisement.

13. One or more computer-readable storage media as described in claim 12, wherein the instructions, when executed by the client device, further cause the client device to pre-load the zero fixed placement (ZFP) advertisement associated with the trigger from the ad source when the code for the user interface is loaded.

14. One or more computer-readable storage media as described in claim 12, wherein the instructions, when executed by the client device, further cause the client device to load the zero fixed placement (ZFP) advertisement from the ad source responsive to the detection of when the trigger occurs.

15. One or more computer-readable storage media as described in claim 12, wherein the instructions to modify the attributes comprise instructions to:
detect code embedded in the zero fixed placement (ZFP) advertisement that defines the one or more modifications as calls to an ad interface deployed to the client device; and
execute the code embedded in the ZFP advertisement to cause the calls to the ad interface to produce the modified user interface.

16. One or more computer-readable storage media as described in claim 12, wherein the instructions, when executed by the client device, further cause the client device to:
selectively enable interactive features in conjunction with the presentation of the zero fixed placement (ZFP) advertisement in the modified user interface;
detect termination of the presentation of the ZFP advertisement; and
restore the user interface by reverting at least some of the one or more modifications responsive to the detection of termination.

17. A system comprising:
one or more processors;
one or more computer-readable storage media storing instructions that, when executed via the one or more processors, cause the one or more processors to implement an ad service to:
configure a webpage to include a trigger to enable an advertisement served from an ad source in the webpage, the trigger being configured to selectively cause different advertisements to be presented to different users in accordance with a respective user's context, the respective user's context including one or more of a browsing history, user contacts, or profile data, the advertisement:
describing a modification of one or more attributes of the webpage; and
initiated via the trigger independent of a fixed placeholder for the advertisement in a layout of the webpage;
receive a request from a client over a network for the webpage; and
communicate the webpage including the trigger to the client responsive to the request, the webpage configured to cause actions to be performed on the client without using the fixed placeholder for the advertisement including:
loading the webpage;
detecting occurrence of the trigger;
executing the advertisement to cause the modification to the one or more attributes of the webpage in response to the trigger, the modification to the one or more attributes of the webpage including a rearrangement of the layout of the webpage by at least repositioning one or more elements of the webpage that are not associated with the advertisement; and enabling user selection to maintain the modification to the one or more attributes of the webpage after a presentation of the advertisement is terminated.

18. A system as described in claim 17, wherein the instructions, when executed via the one or more processors, further cause the one or more processors to configure the webpage to include the advertisement for communication to the client in response to the request.

19. A system as described in claim 17, wherein the webpage defines at least a portion of a user interface for an application of the client, the application configured to enable interaction with network-based resources from one or more service providers and to communicate with an ad interface to present advertisements served by one or more ad sources in conjunction with the network-based resources.

20. A system as described in claim 17, wherein the one or more processors are implemented via one or more server devices of a service provider, the service provider configured to provide a plurality of services over the network to the client including the ad service.

* * * * *